United States Patent [19]

Nakajima et al.

[11] Patent Number: 4,621,007

[45] Date of Patent: Nov. 4, 1986

[54] INFORMATION SIGNAL RECORDING MEDIUM

[75] Inventors: Hiroshi Nakajima, Sagamihara; Yoshihito Nakane, Yokohama; Toshikazu Goshima, Sagamihara; Osamu Narita, Yokohama; Akira Nishizawa, Yokohama; Fuminari Suzuki, Yokohama, all of Japan

[73] Assignee: Victor Company of Japan, Ltd., Japan

[21] Appl. No.: 741,801

[22] Filed: Jun. 6, 1985

[30] Foreign Application Priority Data

Jun. 8, 1984 [JP]  Japan ................................ 59-116596

[51] Int. Cl.$^4$ ........................ B32B 5/16; B32B 27/08
[52] U.S. Cl. .................................... 428/206; 428/195; 428/244; 428/334; 428/515; 428/518
[58] Field of Search ............... 428/195, 244, 208, 206, 428/518, 515, 334

[56] References Cited

U.S. PATENT DOCUMENTS 4,410,584  10/1983  Toba et al. ................... 428/208 X
4,429,216  1/1984  Brigham ...................... 428/195 X Primary Examiner—Thomas J. Herbert
Attorney, Agent, or Firm—Andrus, Sceales, Starke & Sawall

[57] ABSTRACT

An information signal recording medium comprises a core material made of a non-conductive material, and a surface material made of a conductive material and in close adherence with at least one surface of the core material. Variations in geometrical configuration in accordance with information signals to be recorded on the recording medium are compression molded on the surface material. The materials constituting the surface material and the core material are selected so that a ratio $V_C/V_N$ between a melt viscosity $V_C$ of the surface material and a melt viscosity $V_N$ of the core material at a temperature and a shear rate at the time of the compression molding is less than or approximately equal to 1.6.

18 Claims, No Drawings

INFORMATION SIGNAL RECORDING MEDIUM

BACKGROUND OF THE INVENTION

The present invention generally relates to information signal recording mediums such as video discs and digital audio discs, and more particularly to an electrostatic capacitance type high density information signal recording medium which is recorded on a surface thereof with information signals as variations in geometrical configuration. The recorded information signals are reproduced from the information signal recording medium as variations in electrostatic capacitance formed between the information signal recording medium and an electrode of a reproducing stylus which relatively scans over the surface.

Recently, a system has been reduced to practice and has become popular wherein a reproducing apparatus reproduces recorded information signals from an electrostatic capacitance type information signal recording disc. The information signals are recorded on the disc as variations in geometrical configuration such as formation of pits. The reproducing apparatus reproduces the recorded information signals from the disc as variations in electrostatic capacitance between the disc and an electrode of a reproducing stylus. This type of disc is used as a video disc which is recorded with video and audio signals, an audio disc which is recorded with audio signals, and the like. In a certain kind of the audio disc, the disc is recorded with video signals related to still pictures in addition to the audio signals.

In any kind of electrostatic capacitance type information signal recording disc, a part of the disc containing the variations in geometrical configuration functions as an electrode which forms the electrostatic capacitance between the electrode of the reproducing stylus. Thus, this part of the disc is made of a conductive material. The conventional electrostatic capacitance type information signal recording disc is formed by heating and pressing, by use of a die provided with stampers, a conductive resin composition which is obtained by admixing a conductive material such as carbon black powder into polyvinyl chloride resing.

However, according to the conventional electrostatic capacitance type information signal recording disc, the entire disc is formed from the conductive resin. Hence, even the central part of the disc in the thickness direction thereof which does not contribute to the signal reproduction, is formed from the conductive resin. But as is well known, the carbon black powder is relatively expensive, and the conductive resin is accordingly expensive. Therefore, the conventional disc which is formed from the conductive resin in its entirety is expensive, and there is a disadvantage in that no measures can be taken to reduce the manufacturing cost of the disc because the conductive resin is expensive.

When manufacturing the conventional disc, a tablet which is made of a conductive resin and has a size such that the diameter thereof is approximately ½ the diameter of the disc is prepared. This tablet is heated and pressed by a die provided with a pair of stampers and is then stamped, so as to obtain a disc having a predetermined thickness and having the variations in geometrical configurations formed on the surface thereof. However, when the tablet (conductive resin) is heated and pressed by the stampers and stamped, the conductive resin is spread between the stampers. Hence, the stamping surfaces of the stampers are easily damaged by the spreading conductive resin which rubs the stamping surfaces. As a result, there is a disadvantage in that the serviceable life of the stampers is short.

In addition, it takes a certain time to prepare the tablet, and there is a disadvantage in that it is difficult to reduce the disc manufacturing cycle. Furthermore, in order to prepare uniform tablets, it is necessary to adjust a tablet forming machine which is provided with respect to each disc pressing (compresion molding) machine which forms the disc. Consequently, there is a disadvantage in that a troublesome operation is required to adjust the tablet forming machine.

On the other hand, a disc forming method in which the disadvantage described before that the disc is expensive because the entire disc is made from the conductive resin containing the expensive carbon black powder is eliminated, was proposed in a Japanese Laid-Open Patent Application No. 58-55224 (Japanese Patent Application No. 57-154470 filed Sept. 3, 1982). This previously proposed disc forming method comprises the steps of forming sheets which are made from a conductive plastic containing the carbon black, positioning the sheets with respect to the stampers within a metal die which is used for compression molding, placing a core material which is made from a non-conductive plastic and is in the form of a dumpling so that the core material may be subjected to the compression molding between the sheets, and forming a disc having such a sandwich type construction that the surface parts of the disc are conductive and the central part of the disc is non-conductive.

According to the disc forming method proposed in the above Japanese Laid-Open Application, the quantity of conductive plastic which is required can be reduced by a quantity corresponding to the core material. Thus, the quantity of conductive plastic and accordingly the quantity of the expensive carbon black which is required to form one disc can be reduced, and there is an advantage in that the manufacturing cost of the disc can be reduced.

However, according to the disc forming method proposed in the above Japanese Laid-Open Application, bubbles are easily mixed between the sheet and the core material when the stampers subject the sheets and the core material interposed therebetween to the compression molding so as to obtain the disc. Further, dust particles or the like easily adheres to the core material when supplying the core material between the sheets, and the dust particles or the like are also subjected to the compression molding. In this case, there is a disadvantage in that the bubbles and foreign substances such as the dust particles remain between the sheet and the core material of the disc which is formed by the compression molding. Such a disc contains irregularities on the signal recording surface thereof, and the recorded signals cannot be reproduced in a normal manner at parts of the recording surface containing the irregularities. In addition, when forming the disc by the compression molding, the sheets and the core material must be supplied to the compression molding machine independently. However, it is difficult to supply the sheets and the core material independently in a satisfactory manner, and the construction of an apparatus for independently supplying the sheets and the core material to the compression molding machine is complex. Moreover, it takes a certain time to complete the pressing cycle, and there is a disadvantage in that virtually no measure can be taken to reduce the pressing cycle. Further, when the stampers form the disc by the compression molding, the stampers must press and spread the core material indirectly, that is, through the sheets. For this reason, much of the pressing force of the stampers is used up to spread the core material, and there is a disadvantage in that the variations of geometrical configurations such as the formation of pits cannot be formed on the recording surface of the sheet in a satisfactory manner.

Accordingly, in order to overcome the disadvantages of the conventional method described heretofore, an electrostatic capacitance type information signal recording medium and manufacturing method thereof were proposed in a U.S. patent application Ser. No. 686,156 filed Dec. 26, 1984 in which the assignee is the same as the assignee of the present application. The novel electrostatic capacitance type information signal recording medium proposed in the U.S. Patent application Ser. No. 686,156 is formed by preparing a plate member having such a laminated structure that a conductive resin sheet which is used as the surface material is provided on one or both surfaces of a core sheet and stamping on the surface of the conductive resin sheet part of the plate member variations in geometrical configurations in accordance with signals to be recorded on the disc.

However, in the case of the recording medium proposed in the Japanese Laid-Open Application or the U.S. Application, it has been found that the variations in the geometrical configuration such as pits may not be formed satisfactorily on the conductive surface material resin sheet when the recording medium is compression molded or that the conductive surface material resin sheet may be cut. When such unsatisfactory formation of the variations in geometrical configuration or the cut in the conductive surface material resin sheet takes place, a large number of defective products are produced during the compression molding and the yield of the manufactured recording mediums becomes poor.

Accordingly, the present inventors continued research with respect to the poor yield when the recording mediums are compression molded. As a result of the research, the present inventors have found that the fraction defective of the compression molded recording mediums greatly changes depending on the relationship of the magnitudes of the melt viscosities of the non-conductive core material and the conductive surface material, and have completed the present invention based on the findings.

In other words, at the temperature (for example, 180° to 190°) which is reached when the compression molding takes place in the compression molding machine, the core material melts and spreads before the surface material due to the pressing pressure at the time of the compression molding when the melt viscosity of the core material is within a certain range close to the melt viscosity of the surface material, and the pits cannot be formed on the surface material satisfactorily. Hence, it is desirable that the melt viscosity of the core material is greater than the melt viscosity of the surface material. However, as a result of research, it has been found that the melt viscosity of the core material may be slightly smaller than the melt viscosity of the surface material, because although the temperature of the stamper of the compression molding machine is immediately transmitted to the surface material at the time of the compression molding, there is a time delay before the temperature is transmitted to the entire core material.

SUMMARY OF THE INVENTION

Accordingly, it is a general object of the present invention to provide a novel and useful information signal recording medium in which the problems described before are eliminated.

Another and more specific object of the present invention is to provide an information signal recording medium comprising a core material made of a non-conductive material and a surface material made of a conductive material and in close adherence with at least one surface of the core material. Variations in geometrical configurations in accordance with information signals to be recorded on the information signal recording medium are formed on the surface material by compression molding. In the information signal recording medium of the present invention, the materials used for the surface material and the core material are selected so that a ratio $V_C/V_N$ between a melt viscosity $V_C$ of the surface material and a melt viscosity $V_N$ of the core material at a temperature and shear rate at the time of the compression molding is approximately equal to or less than 1.6. According to the information signal recording medium of the present invention, the core material spreads before the surface material when the variations in the geometrical configuration in accordance with the information signals are compression molded on the surface material. Hence, an incomplete formation will not occur when forming the variations in the geometrical configuration on the surface material, and cuts or the like will not be formed in the surface material. Therefore, the variations in the geometrical configuration are compression molded on the surface material satisfactorily, and the fraction defective of the compression molded information signal recording mediums is greatly reduced.

Other objects and further features of the present invention will be apparent from the following detailed description on each of examples given hereinafter.

DETAILED DESCRIPTION

[Example 1]

First, a conductive surface material is formed. 100 percent by weight of polyvinyl chloride and cetyl vinyl ether copolymer (C-101 manufactured by Nippon Zeon Co. Ltd. of Japan), 5 percent by weight of dibutil tin mercaptan stabilizer, 2 percent by weight of higher fatty acid lubricant, 0.5 percent by weight of high fatty ester lubricant, and 1 percent by weight of dimethyl polysiloxane lubricant are thoroughly mixed in a SUPER MIXER (high-speed mixer) manufactured by Kawata Co., Ltd. of Japan). When the temperature in the mixer reaches 120° C., 20 percent by weight of carbon black (BLACK PEARLS (Registered Trademark) 2000 manufactured by Cabot Corporation of the United States) is admixed to the mixture in the mixer, and is again thoroughly mixed. The mixture in the mixer is then cooled down to 40° C. by reducing the rotational speed of the mixer. The conductive resin containing the carbon black is removed from the mixer, and is pelletized by use of a kneader PR-46 manufactured by Buss of Switzerland (with a screw temperature of 80° C. and a cylinder temperature of 110° C.). The pellets are spread into a sheet having a thickness of 0.1 mm and a width of 26 cm by use of an extruder FS-40 manufactured by Ikegai Iron Works, Ltd. of Japan and a calender roll (inverted L-shaped 8-inch roll).

As a result of measuring the melt viscosity of the conductive surface material by use of a flow tester manufactured by Shimadzu Seisakusho Ltd. of Japan (capillary tube having a diameter of 1 mm, length of 10 mm, material temperature of 180° C., and a shear rate of 10 sec$^{-1}$), the melt viscosity of the conductive surface material was $2.4 \times 10^4$ Pa.sec.

When forming the non-conductive core material, 100 percent by weight of polyvinyl chloride homopolymer powder (SA-1000N manufactured by Sun Arrow Chemicals Co., Ltd. of Japan), 3 percent by weight of dibutyl tin laurylate stabilizer, 1.5 percent by weight of epoxy soya bean oil stabilizer, and 0.3 percent by weight of calcium stearate lubricant are thoroughly mixed in a SUPER MIXER (high-speed mixer) manufactured by Kawata Co., Ltd. of Japan. The rotational speed of the mixer is reduced when the temperature in the mixer reached 120° C. Then, the mixer is cooled down to 40° C. and the resin is removed from the mixer. The resin is kneaded and pelletized by use of a uniaxial extruder manufactured by Takayasu Tekkosho Co., Ltd. of Japan. The pellets are extruded into a sheet having a thickness of 1.3 mm and a width of 26 cm by use of an extruder FS-65 manufactured by Ikegai Iron Works. Ltd. of Japan and a T-die. The sheet of the surface material described before and the sheet of the core material are laminated and rolled by a polishing roll. Thereafter, the laminated sheet is cut into approximately 26 cm squares by a cutter for cutting constant length of the laminated sheet.

As a result of measuring the melt viscosity of the non-conductive core material under the same conditions as the measurement performed with respect to the conductive surface material, the melt viscosity of the non-conductive core material was $4.7 \times 10^4$ Pa.sec.

The cut laminated sheet is placed on a stamper of a heat compression molding machine exclusively for compression molding the video disc (press pressure of 100 tons with a hydraulic pressure of 140 kg/cm$^3$, with the die being steam heated and water cooled). The electrostatic capacitance type video disc is obtained by heat compression molding the laminated sheet (surface temperature of the stamper at the time of the heating being a maximum of 180° C. and being a minimum of 20° C. at the time of cooling). The formation of the variations in geometrical configuration (pits) on the video disc was observed by use of a scan type electron microscope, and the reproducing characteristics were examined by reproducing the recorded signals from the video disc on a reproducing apparatus. Similar observations were made for each of the examples described hereinafter. As a result, it was found that the pits were formed satisfactorily on the video disc in the present example.

[Example 2]

The conductive surface material used in the present example is the same as the conductive surface material used in the first example. As for the non-conductive core material, an acrylate resin (ACRYPET VH (Registered Trademark) manufactured by Mitsubishi Rayon Co., Ltd. of Japan) is used instead of the polyvinyl chloride homopolymer AS1000N used in the first example. The video disc is obtained similarly as described before by use of such conductive surface material and non-conductive core material. According to the present example, the pits are also formed satisfactorily on the video disc.

As a result of measuring the melt viscosity of the non-conductive core material under the same conditions as the measurements described before, the melt viscosity of the non-conductive core material was $4.5 \times 10^4$ Pa.sec.

[Example 3]

The conductive surface material used in the present example is the same as the conductive surface material used in the first example. As for the non-conductive core material, another polyvinyl chloride homopolymer (SA-800B manufactured by Sun Arrow Chemicals Co., Ltd. of Japan) is used instead of the polyvinyl chloride homopolymer AS-1000N used in the first example. The video disc is obtained similarly as described before by use of such conductive surface material and non-conductive core material. According to the present example, the pits are also formed satisfactorily on the video disc.

As a result of measuring the melt viscosity of the non-conductive core material under the same conditions as the measurements described before, the melt viscosity of the non-conductive core material was $4.0 \times 10^4$ Pa.sec.

[Example 4]

The conductive surface material used in the present example is the same as the conductive surface material used in the first example. As for the non-conductive core material, another polyvinyl chloride homopolymer (SA-700K manufactured by Sun Arrow Chemicals Co., Ltd. of Japan) is used instead of the polyvinyl chloride homopolymer SA-1000N used in the first example. The video disc is obtained similarly as described before by use of such conductive surface material and non-conductive core material. According to the present example, the pits are also formed satisfactorily on the video disc.

As a result of measuring the melt viscosity of the non-conductive core material under the same conditions as the measurements described before, the melt viscosity of the non-conductive core material was $3.5 \times 10^4$ Pa.sec.

[Example 5]

Instead of the polyvinyl chloride and cetyl vinyl ether copolymer used in the first example, polyvinyl chloride resins (TOSE ACE GK (Registered Trademark) manufactured by Tokuyama-Sekisui Ind., Co., Ltd. of Japan) is used for the conductive surface material. As a result of measuring the melt viscosity of the conductive surface material under the same conditions as the measurements described before, the melt viscosity of the conductive surface material was $3.5 \times 10^4$ Pa.sec.

As for the non-conductive core material, another polyvinyl chloride homopolymer (SA-100N manufactured by Sun Arrow Chemicals Co., Ltd. of Japan) is used instead of the polyvinyl chloride homopolymer SA-700K used in the fourth example. The video disc is obtained similarly as described before by use of such conductive surface material and non-conductive core material. According to the present example, the pits are also formed satisfactorily on the video disc.

As a result of measuring the melt viscosity of the non-conductive core material under the same conditions as the measurements described before, the melt viscosity of the non-conductive core material was $4.7 \times 10^4$ Pa.sec.

[Example 6]

The conductive surface material used in the present example is the same as the conductive surface material used in the fifth example. As for the non-conductive core material, an acrylate resin (ACRYPET VH (Registered Trademark) manufactured by Mitsubishi Rayon Co., Ltd. of Japan) is used instead of the polyvinyl chloride homopolymer SA-1000N used in the fifth example. The video disc is obtained similarly as described before by use of such conductive surface material and non-conductive core material. According to the present example, the pits are also formed satisfactorily on the video disc.

As a result of measuring the melt viscosity of the non-conductive core material under the same conditions as the measurements described before, the melt viscosity of the non-conductive core material was $4.5 \times 10^4$ Pa.sec.

[Example 7]

The conductive surface material used in the present example is the same as the conductive surface material used in the fifth example. As for the non-conductive core material, another polyvinyl chloride homopolymer (SA-800B manufactured by Sun Arrow Chemicals Co., Ltd. of Japan) is used instead of the polyvinyl chloride homopolymer AS-1000N used in the fifth example. The video disc is obtained similarly as described before by use of such conductive surface material and non-conductive core material. According to the present example, the pits are also formed satisfactorily on the video disc.

As a result of measuring the melt viscosity of the non-conductive core material under the same conditions as the measurements described before, the melt viscosity of the non-conductive core material was $4.0 \times 10^4$ Pa.sec.

[Example 8]

The conductive surface material used in the present example is the same as the conductive surface material used in the fifth example. As for the non-conductive core material, another polyvinyl chloride homopolymer (SA-700K manufactured by Sun Arrow Chemicals Co., Ltd. of Japan) is used instead of the polyvinyl chloride homopolymer SA-100N used in the fifth example. The video disc is obtained similarly as described before by use of such conductive surface material and non-conductive core material. According to the present example, the pits are also formed satisfactorily on the video disc.

As a result of measuring the melt viscosity of the non-conductive core material under the same conditions as the measurements described before, the melt viscosity of the non-conductive core material was $3.5 \times 10^4$ Pa.sec.

[Example 9]

The conductive surface material used in the present example is the same as the conductive surface material used in the fifth example. As for the non-conductive core material, 100 percent by weight of polyvinyl chloride homopolymer powder (103EP8 manufactured by Nippon Zeon Co., Ltd. of Japan), 3 percent by weight of dibutyl tin mercaptan stabilizer, 1 percent by weight of monoglyceride stearate lubricant, and 0.5 percent by weight of ester wax lubricant are used for the non-conductive core material. The video disc is obtained similarly as described before by use of such conductive surface material and non-conductive core material. According to the present example, the pits are also formed satisfactorily on the video disc.

As a result of measuring the melt viscosity of the non-conductive core material under the same conditions as the measurements described before, the melt viscosity of the non-conductive core material was $3.2 \times 10^4$ Pa.sec.

[Example 10]

The conductive surface material used in the present example is the same as the conductive surface material used in the fifth example. As for the non-conductive core material, another polyvinyl chloride homopolymer (103EP8D manufactured by Nippon Zeon Co., Ltd. of Japan) is used instead of the polyvinyl chloride homopolymer 103EP8 used in the ninth example. The video disc is obtained similarly as described before by use of such conductive surface material and non-conductive core material. According to the present example, the pits are also formed satisfactorily on the video disc.

As a result of measuring the melt viscosity of the non-conductive core material under the same conditions as the measurements described before, the melt viscosity of the non-conductive core material was $2.9 \times 10^4$ Pa.sec.

[Example 11]

The conductive surface material used in the present example is the same as the conductive surface material used in the fifth example. As for the non-conductive core material, 70 percent by weight of another polyvinyl chloride homopolymer powder (103EP8D manufactured by Nippon Zeon Co., Ltd. of Japan) and 30 percent by weight of polymethyl metacrylate (P551 manufactured by Mitsubishi Rayon Co., Ltd. of Japan) are used instead of the 100 percent by weight of polyvinyl chloride homopolymer 103EP8 used in the ninth example. The video disc is obtained similarly as described before by use of such conductive surface material and non-conductive core material. According to the present example, the pits are not formed in a completely satisfactory manner on the video disc, but the video disc is tolerable from the practical point of view.

As a result of measuring the melt viscosity of the non-conductive core material under the same conditions as the measurements described before, the melt viscosity of the non-conductive core material was $2.6 \times 10^4$ Pa.sec.

[Example 12]

The conductive surface material used in the present example is the same as the conductive surface material used in the first example. As for the non-conductive core material, another polyvinyl chloride homopolymer (RZ-55 manufactured by Nippon Zeon Co., Ltd. of Japan) is used instead of the polyvinyl chloride homopolymer SA-1000N used in the first example. The video disc is obtained similarly as described before by use of such conductive surface material and non-conductive core material. According to the present example, the pits are not formed in a completely satisfactory manner on the video disc, but the video disc is tolerable from the practical point of view.

As a result of measuring the melt viscosity of the non-conductive core material under the same conditions as the measurements described before, the melt viscosity of the non-conductive core material was $1.5 \times 10^4$ Pa.sec.

[Example 13]

The conductive surface material used in the present example is the same as the conductive surface material used in the first example. As for the non-conductive core material, a polyvinyl chloride polyvinyl and acetate copolymer (RZ-55 manufactured by Nippon Zeon Co., Ltd. of Japan) is used instead of the polyvinyl chloride homopolymer SA-1000N used in the first example. The video disc is obtained similarly as described before by use of such conductive surface material and non-conductive core material. According to the present example, the pits are not formed in a satisfactory manner on the video disc.

As a result of measuring the melt viscosity of the non-conductive core material under the same conditions as the measurements described before, the melt viscosity of the non-conductive core material was $1.1 \times 10^4$ Pa.sec.

[Example 14]

The conductive surface material used in the present example is the same as the conductive surface material used in the fifth example. As for the non-conductive core material, another polyvinyl chloride homopolymer (RZ-55 manufactured by Nippon Zeon Co., Ltd. of Japan) is used instead of the polyvinyl chloride homopolymer SA-1000N used in the fifth example. The video disc is obtained similarly as described before by use of such conductive surface material and non-conductive core material. According to the present example, the pits are not formed in a satisfactory manner on the video disc.

As a result of measuring the melt viscosity of the non-conductive core material under the same conditions as the measurements described before, the melt viscosity of the non-conductive core material was $1.5 \times 10^4$ Pa.sec.

[Example 15]

The conductive surface material used in the present example is the same as the conductive surface material used in the fifth example. As for the non-conductive core material, a polyvinyl chloride polyvinyl and acetate copolymer (400X150P manufactured by Nippon Zeon Co., Ltd. of Japan) is used instead of the polyvinyl chloride homopolymer SA-1000N used in the fifth example. The video disc is obtained similarly as described before by use ofg such conductive surface material and non-conductive core material. According to the present example, the pits are not formed in a satisfactory manner on the video disc.

As a result of measuring the melt viscosity of the non-conductive core material under the same conditions as the measurements described before, the melt viscosity of the non-conductive core material was $1.1 \times 10^4$ Pa.sec.

The ratio $V_C/V_N$ between the melt viscosity $V_C$ (Pa.sec) of the conductive surface material and the melt viscosity $V_N$ (Pa.sec) of the non-conductive core material and whether or not the pits are formed satisfactorily on the video disc, can be tabulated as shown in the following for each of the examples described heretofore, for a temperature of 180° C. and a shear rate of 10 sec$^{-1}$ which correspond to the pressing conditions of the compression molding machine.

TABLE

| Example | $V_C/V_N$ | Formed Pits |
|---|---|---|
| 1 | 0.51 | Good |
| 2 | 0.53 | Good |
| 3 | 0.63 | Good |
| 4 | 0.69 | Good |
| 5 | 0.74 | Good |
| 6 | 0.78 | Good |
| 7 | 0.88 | Good |
| 8 | 1.00 | Good |
| 9 | 1.09 | Good |
| 10 | 1.21 | Good |
| 11 | 1.35 | Poor |
| 12 | 1.60 | Poor |
| 13 | 2.18 | No Good |
| 14 | 2.33 | No Good |
| 15 | 3.18 | No Good |

As may be seen by comparing each of the examples described before, it is possible to compression mold fair pits when the ratio $V_C/V_N$ of the melt viscosities of the conductive surface material and the non-conductive core material is less than or approximately equal to 1.6. Further, it is possible to compression mold better pits (good pits) when the ratio $V_C/V_N$ is less than or approximately equal to 1.21.

The conductive surface material contains carbon black or the like which is admixed to the material to make the surface material conductive, and there is a limit in reducing the melt viscosity of the conductive surface material. For example, at a temperature of 180° C. and a shear rate of 10 sec$^{-1}$, a melt viscosity of $2 \times 10^4$ Pa.sec may be considered as a limit. Accordingly, in this case, when it is assumed that the limit of the ratio between the melt viscosities of the conductive surface material and the non-conductive core material is equal to 1.2, the melt viscosity of the non-conductive core material must be greater than or approximately equal to $1.7 \times 10^4$ Pa.sec. In this case, it is not essential for the non-conductive core material to melt under a condition wherein the temperature is 180° C. and the shear rate is 10 sec$^{-1}$ which condition is the same as the condition described above, and the non-conductive core material may be a material which does not melt under this condition.

Because the conductive surface material contains the relatively expensive carbon black, it is desirable to make the thickness of the surface material small from the point of reducing the manufacturing cost. However, when the thickness of the conductive surface material is made extremely small, a sufficient electrostatic capacitance cannot be formed between the conductive surface material and the reproducing stylus and satisfactory reproduction cannot be performed in some cases. It was found that the thickness of the conductive surface material should have a value in the range of approximately 20 μm to 200 μm.

The conductive surface material and the non-conductive core material need not be made into a laminated sheet before the compression molding, and for example, a non-conductive core material which is in the form of a dumpling may be used. In this case, the conductive surface material is adhered to the non-conductive core material dumpling and the two are subjected to a compression molding. On the other hand, a non-conductive core material may be injected within a conductive surface material which is in the form of a dumpling and the two may be subjected to a compression molding.

Further, the present invention is not limited to the examples given heretofore, and various variations and modifications may be made without departing from the scope of the present invention.

What is claimed is:

1. An information signal recording medium of electrostatic capacitance type comprising:
   a core material made of a non-conductive material, said core material containing a polyvinyl chloride homopolymer as a base; and
   a surface material made of a conductive material and in close adherence with at least one surface of said core material, variations in geometrical configuration in accordance with information signals to be recorded on the recording medium being compression molded on said surface material, said surface material containing a polyvinyl chloride resins as a base and being admixed with carbon black,
   the materials constituting said surface material and said core material being selected so that a ratio $V_C/V_N$ between a melt viscosity $V_C$ of said surface material and a melt viscosity $V_N$ of said core material at a temperature and a shear rate at the time of the compression molding is less than or approximately equal to 1.6.

2. An information signal recording medium as claimed in claim 1 in which the thickness of said surface material is selected to a value in a range of approximately 20 μm to 200 μm.

3. An information signal recording medium as claimed in claim 1 in which the melt viscosity of said core material is greater than or approximately equal to $1.7 \times 10^4$ Pa.sec at a temperature of 180° C. and a shear rate of 10 sec$^{-1}$.

4. An information signal recording medium as claimed in claim 1 in which the melt viscosity of said surface material is greater than or approximately equal to $2 \times 10^4$ Pa.sec at a temperature of 180° C. and a shear rate of 10 sec$^{-1}$.

5. An information signal recording medium as claimed in claim 1 in which the materials constituting said surface material and said core material are selected so that the ratio $V_C/V_N$ between the melt viscosities $V_C$ and $V_N$ is less than or approximately equal to 1.2.

6. An information signal recording medium as claimed in claim 1 in which said core material is formed as a sheet and said surface material is in close adherence with at least one surface of the core material sheet.

7. An information signal recording medium as claimed in claim 1 in which said core material is admixed with a predetermined stabilizer and lubricant to the base thereof.

8. An information signal recording medium as claimed in claim 1 in which said surface material is admixed with a predetermined stabilizer and lubricant to the base thereof.

9. An information signal recording medium as claimed in claim 1 in which said surface material contains a polyvinyl chloride and cetyl vinyl ether copolymer as the base and is admixed with a predetermined stabilizer and lubricant.

10. An information signal recording medium of electrostatic capacitance type comprising:
    a core material made of a non-conductive material, and core material containing an acrylate resin as a base; and
    a surface material made of a conductive material and in close adherence with at least one surface of said core material, variations in geometrical configuration in accordance with information signals to be recorded on the recording medium being compression molded on said surface material, said surface material containing a polyvinyl chloride resins as a base and being admixed with carbon black,
    the materials constituting said surface material and said core material being selected so that a ratio $V_C/V_N$ between a melt viscosity $V_C$ of said surface material and a melt viscosity $V_N$ of said core material at a temperature and a shear rate at the time of the compression molding is less than or approximately equal to 1.6.

11. An information signal recording medium as claimed in claim 10 in which the melt viscosity of said core material is greater than or approximately equal to $1.7 \times 10^4$ Pa.sec at a temperature of 180° C. and a shear rate of 10 sec$^{-1}$.

12. An information signal recording medium as claimed in claim 10 in which the melt viscosity of said surface material is greater than or approximately equal to $2 \times 10^4$ Pa.sec at a temperature of 180° C. and a shear rate of 10 sec$^{-1}$.

13. An information signal recording medium as claimed in claim 10 in which the materials constituting said surface material and said core material are selected so that the ratio $V_C/V_N$ between the melt viscosities $V_C$ $V_N$ is less than or approximately equal to 1.2.

14. An information signal recording medium as claimed in claim 10 in which said core material is formed as a sheet and said surface material is in close adherence with at least one surface of the core material sheet.

15. An information signal recording medium as claimed in claim 10 in which said core material is admixed with a predetermined stabilizer and lubricant to the base thereof.

16. An information signal recording medium as claimed in claim 10 in which said surface material is admixed with a predetermined stabilizer and lubricant to the base thereof.

17. An information signal recording medium as claimed in claim 10 in which said surface material contains a polyvinyl chloride and cetyl vinyl ether copolymer as the base and is admixed with a predetermined stabilizer and lubricant.

18. An information signal recording medium as claimed in claim 10 in which the thickness of said surface material is selected to a value in a range of approximately 20 μm to 200 μm.

* * * * *